Aug. 26, 1958  W. J. COLSON  2,849,015
TANK PRESSURE COORDINATING MECHANISMS
Filed Sept. 27, 1954  2 Sheets-Sheet 1

INVENTOR.
WILLIAM J. COLSON
BY
Reynolds, Beach & Christensen
ATTORNEYS

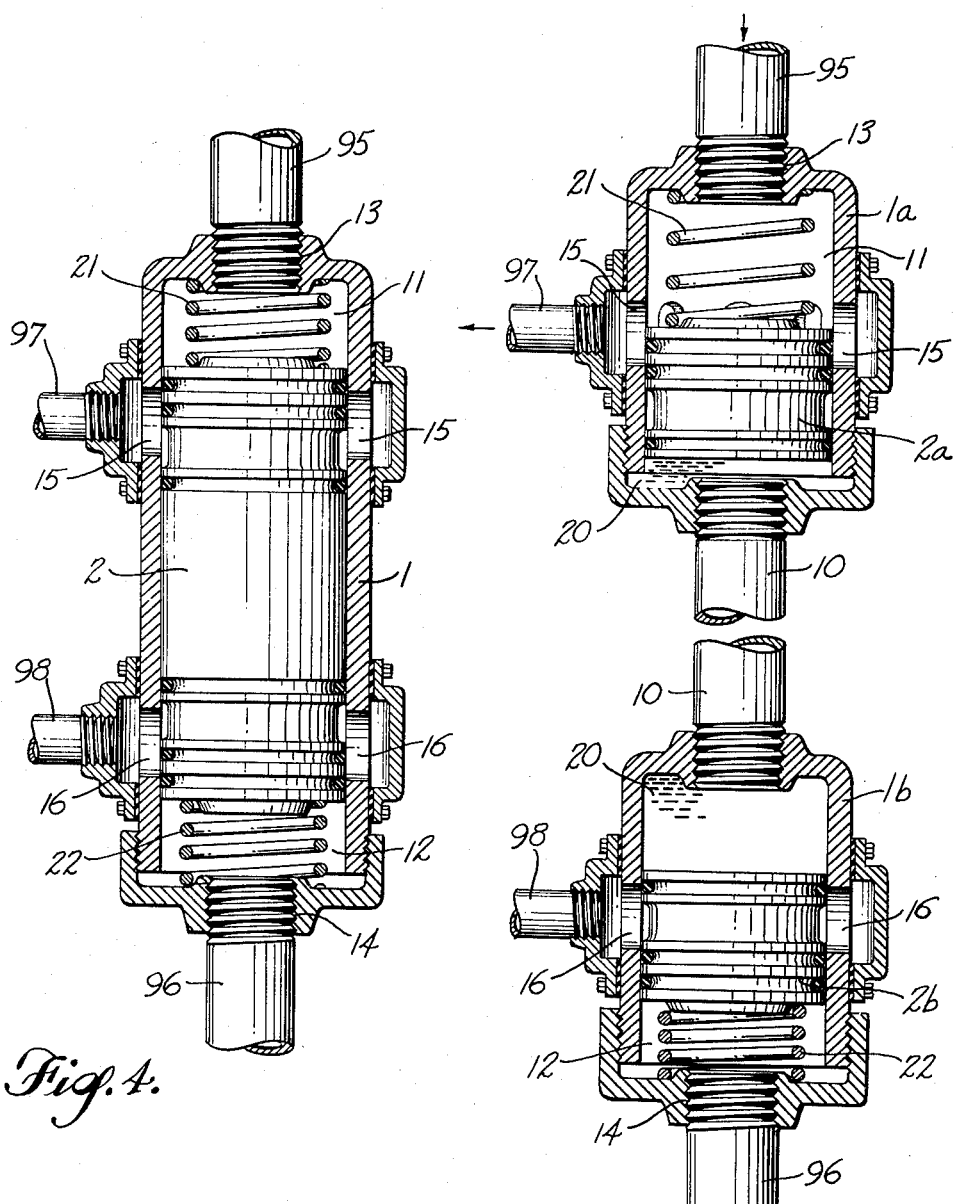

United States Patent Office 2,849,015
Patented Aug. 26, 1958

2,849,015

TANK PRESSURE COORDINATING MECHANISMS

William J. Colson, Mercer Island, Wash., assignor to Boeing Airplane Company, Seattle, Wash., a corporation of Delaware Application September 27, 1954, Serial No. 458,422

6 Claims. (Cl. 137—98)

Certain problems arise in the operation of rockets in connection with the propellant fluids, which are normally two liquids or gases which react upon their admixture. It will be convenient, therefore, to refer to the rocket propellant problems specifically as illustrative, although to the extent that the invention is of more general application it is not intended thereby to limit its use to that specific field.

In such rockets the propellant fluids may be, the one, a fuel, and the other an acid, which are supplied from separate tanks, and which are led by separate supply ducts to a reactor, such as may be termed a burner or the like, where they commingle and react. Sometimes there are generators for one or the other of the propellant fluids, or there are sources of a pressurizing gas applicable to the respective fluid tanks, and because the rate of generation of the propellant fluids may vary, or because the rate of delivery of pressurizing gas may vary, or from other causes, the pressure in one of the propellant fluid tanks may exceed that pressure which is consonant with the pressure in the other propellant fluid tank. When this occurs there is failure to effect mixture of the two fluids at the burner or the like in the proper ratio, and the propulsive thrust lessens as a result; or the fluid mixture may become so unbalanced as to destroy the rocket. The mixture control is so critical that great difficulty has attended the maintenance of the propulsive thrust beyond its initial lifting effort, through a time measured in seconds. It may be assumed that the pressures in the two propellant fluid tanks are not necessarily equal, but that they should remain at a constant ratio or within a given and relatively narrow range, for proper maintenance of the thrust to maximum values.

Because of the necessity of maintaining such a balance or ratio of pressure as between the two tanks, it is impracticable to effect relief of excess pressure in one tank, or in both, by normal relief valves, for the relief of pressure in one tank may cause the pressure to drop therein at a time when, for example by reason of an increase in the rate of generation, or of pressurization from independent pressurizing sources, the pressure may be rising in the companion tank. Naturally it is undesirable to lose any of the propellant or of the pressurizing fluid, yet it is better to lose some, a minimum only, than to lose propulsive thrust. Furthermore, in effecting any relief of either gas it becomes dangerous to spill the one gas in a location where it may, at least within the rocket shell, mingle with the other gas.

The present invention has for its object the provision of relief means which will effect relief of an excess pressure in either tank, spilling the excess harmlessly overboard, and which will at the same time restore and maintain the desired pressure relationship or ratio between the pressures in the two tanks. By the present invention a single and simple relief valve will automatically effect relief of excess pressure, whether of the propellant fluid itself or of the pressurizing gas is immaterial, from either or from both tanks simultaneously, at the same time maintaining the desired pressure relationship.

In accordance with one particular phase of the present invention the relief valve is constructed in such a way as to afford the capability of simultaneously and automatically relieving excess pressures in both tanks, regardless of the pressure relationship between them, and of restoring the desired pressure relationship automatically as soon as excess pressure is relieved. At the same time, and by the same relief valve, any excess of pressure in one tank over the pressure in the other—in other words, any disturbance of the pressure relationship originating or occurring in either one of the tanks—is automatically relieved.

The present invention aims at the production of a relief valve in any of several specific forms, which is adapted to the above ends, which is simple in construction and operation, and fully automatic, and which is of light weight and small bulk, adapting it to installation within a rocket.

In the drawings Figure 1 illustrates diagrammatically the essential portions of the propellant fluid system, including pressurizing gas sources applied to the acid tank and to the fuel tank, respectively, and the associated relief valve of this invention.

Figure 3 is a view similar to Figure 2, showing a somewhat modified form of the valve mechanism without (but capable of incorporating) the two-tank relief element.

Figure 4 is a view of the pressure coordinating device in a still further modified form.

Figure 1:
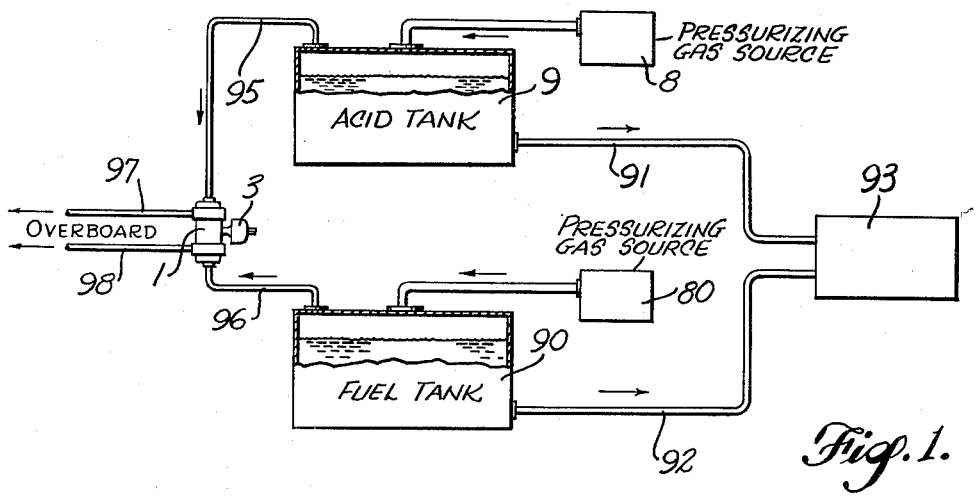

Referring first to Figure 1, an acid tank is indicated at 9, a fuel tank at 90, and supply ducts 91 and 92 lead from these respective tanks through any suitable controls (not shown) to a mixing chamber or burner or the like, indicated at 93, where they commingle and produce thrust. Independent pressurizing gas sources 8 for the acid tank and 80 for the fuel tank are shown also. This is intended to represent the present and known system. According to the present invention a pressure duct 95 leads from the gas space within the acid tank 9 and a pressure duct 96 from the gas space within the fuel tank 90, both to a valve casing 1 which is part of and houses the valve mechanism of the present device. By the respective plungers or pistons, to be described in detail hereinafter, gas from the acid tank 9 by way of the pressure duct 95 may be spilled overboard through the spill duct 97, and gas from the fuel tank 90 by way of the pressure duct 96 may be spilled overboard from the casing 1 by way of the spill duct 98, which is entirely separate from the spill duct 97 for the acid.

The simplest form of the pressure coordinating mechanism of this invention is illustrated in Figure 4. Within the hollow cylindrical casing 1 a plunger 2 is slidably received and suitably packed for axial movement, and to maintain the respective chambers 11 and 12 at the opposite ends of the casing 1 completely out of communication with one another. The pressure duct 95 connects with a pressure port 13 in one end of the casing 1, and the pressure duct 96 connects with a pressure port 14 at the opposite end of the casing, these two pressure ports 13 and 14 affording communication of fluid with the respective chambers 11 and 12. Thus the pressure of the acid is applied to the one face of the plunger 2, and the pressure of the fuel to the opposite face of the same plunger. To assist in maintaining the plunger in a position of equilibrium, even though there may be a difference of absolute pressure as between the chambers 11 and 12, springs 21 and 22 react between the casing and the opposite ends of the plunger 2, and if the pressures in the two tanks are equal, these springs may be of equal strength, or if the pressures in the chambers 11 and 12 are intended to be maintained at unequal values, then the force of the springs 21 and 22 are suitably chosen or adjusted accordingly. Alternatively, the areas of the piston exposed within the chamber 11 and within the chamber 12, respectively, may be different from on another.

The purpose in maintaining the plunger 2 in a position of equilibrium is to maintain it in a position such that under normal pressure conditions and relationships as between the two tanks it will close both the spill port 15 and the spill port 16, which are located adjacent the respectively opposite ends of the casing 1, but closer together than the respective pressure ports 13 and 14. In other words, the ports 15 and 16 are located sufficiently close together that the plunger 2, in a neutral position or position of equilibrium, will close both the spill ports 15 and 16, yet upon the occurrence of excessive pressure, for instance in the tank 9 and hence in the chamber 11, the plunger 2, in Figure 4, will be moved downwardly to uncover the spill port 15 and so to relieve excess pressure within the tank 9 by way of the spill duct 97. Vice versa, if the excess pressure should be in the tank 90, the plunger 2 will move in the opposite sense to uncover the spill port 16 and so to relieve the excess pressure in the tank 90. Upon the restoration of the intended pressure relationship as between the two tanks the plunger in either case will automatically return, under the influence of the springs 21 and 22, to its position of equilibrium, wherein both spill ports are closed, and further loss of a propellant fluid, or of the pressurizing gas for delivery thereof, will be avoided.

The construction in Figure 3 is similar to that of Figure 1. Here the casing is divided into the two casings 1a and 1b, which are connected by means of a connecting duct 10, and the plunger 2 is divided into two pistons 2a and 2b, each shiftable to the extent necessary within its casing 1a or 1b, but with the two pistons interconnected for conjoint movement by means of liquid, as indicated at 20, filling the space within the duct 10 and within the respective casings 1a and 1b between the pistons 2a and 2b. In Figure 3 the position of parts has been indicated such as they would assume upon the occurrence of excess pressure in the tank 9, communicated by way of the pressure duct 95 and spilled overboard by way of the spill duct 97.

Figure 2:
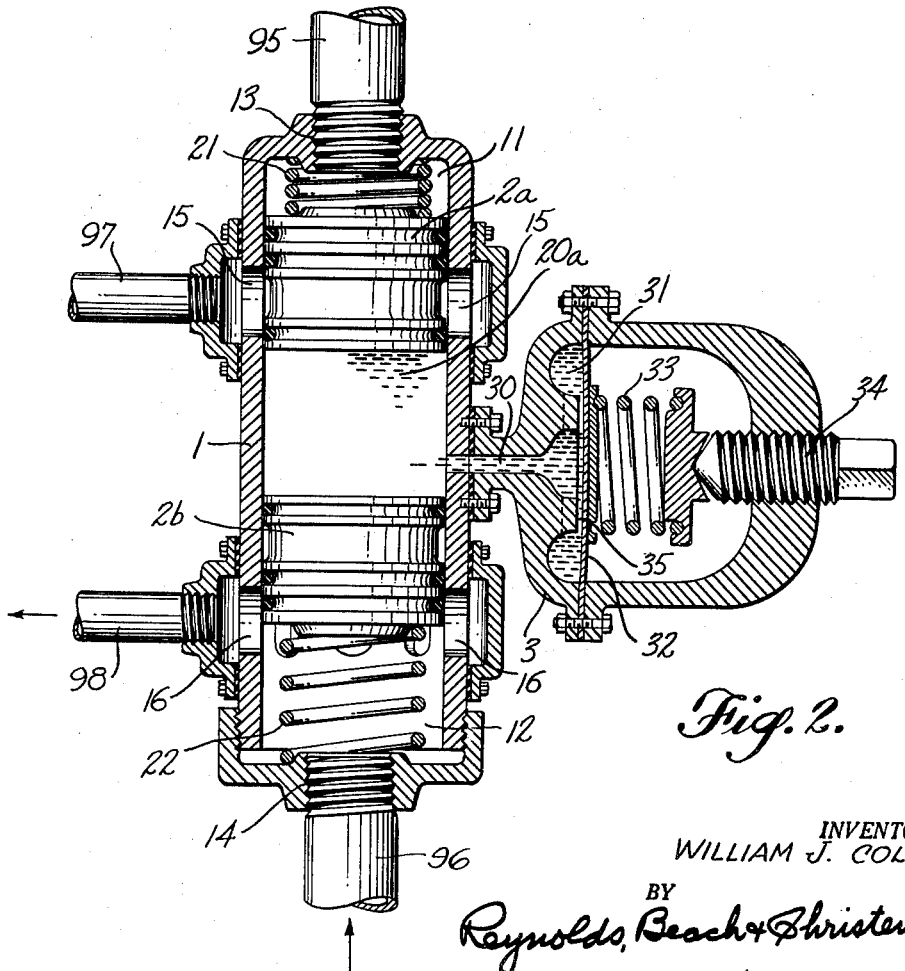
Figure 2 is an axial sectional view through the relief valve, in a form which is capable of excess pressure relief from either or both tanks, with the valve shown in position to effect relief from one tank.

The coordinating mechanism illustrated in Figure 2 combines somewhat the characteristics of the mechanisms shown in Figures 3 and 4, in that the two pistons 2a and 2b are used, but both are received in the same valve casing 1, with the space therein between the pistons 2a and 2b filled by the liquid indicated at 20a. The pistons are shown in this view (Figure 2) in a position such as they would assume upon the occurrence of an excess of pressure in the tank 90, such as to cause the piston 2a to bottom and piston 2b to move opening spill port 16, thereby permitting spilling of the excess pressure from the chamber 12 by way of the spill port 16 and the spill duct 98.

However, in this Figure 2 are illustrated relief means such as are preferably employed, whereby excess absolute pressures in both tanks simultaneously may be relieved. This mechanism includes a casing generally indicated by the numeral 3, ported at 30 for communication directly with the liquid at 20a, the casing 3 defining a chamber 31 which is variable in volume under the influence of pressure transmitted to the liquid at 20a. As representative of a suitable construction, one wall of the chamber 31 is constituted by a yieldable diaphragm 32, backed by a spring 33, the force of which is adjustable by the adjusting means indicated at 34. The force of the spring 33 resisting expansion of the chamber 31 may be sufficient that under normal conditions the diaphragm 32 will remain seated upon the stops 35, and the pistons 2a and 2b will move conjointly and normally at a fixed spacing such as is determined by the liquid at 20a. If, however, excess pressure should occur in both the chambers 11 and 12 simultaneously, these excess pressures will squeeze together the pistons 2a and 2b, and fluid from the chamber at 20a will flow through the duct 30 and will flex the diaphragm 32, increasing the volume of the chamber 31 and so permitting movement of both pistons 2a and 2b to uncover their respective spill ports 15 and 16. As soon as the excess pressure is relieved, and the pressure balance is restored, the spring 33 will restore the diaphragm 32 to its normal position, and thus will restore the pistons 2a and 2b to their normal spacing apart.

Should an excess pressure occur and persist in one of the chambers, as for instance in the chamber 12, this may be sufficient to cause bottoming of the opposite piston 2a, and yet the relief by way of the spill port 16 may be insufficient for the time being to relieve all the excesss pressure in the chamber 12. When this occurs the piston 2b will continue to move toward the piston 2a, which latter is now stationary because it is bottomed, and the diaphragm 32 will be caused to flex as before, and so to increase the effective opening of the spill port 16. Such a condition is illustrated in Figure 2. It is obvious that the relief means 3 might equally well be connected to the duct 10 of Figure 3, with like results.

Thus it is evident that the tank pressure coordinating mechanism of this invention will serve to relieve an excess of pressure in one tank over the pressure in the companion tank, or to relieve both simultaneously, and will serve in addition as relief means to permit relief of an excess in the absolute pressure in either or both such tanks simultaneously.

I claim as my invention:

1. Valve mechanism for coordinating pressure in two tanks such as supply individual interreacting fluids to a common burner or the like, comprising a hollow valve casing, plunger means, including two separated individual pistons and a liquid-filled duct therebetween, said plunger means being of an effective length less than the length of the valve casing, guided therein for sliding movement, and closing off communication between the opposite ends of the casing, a first and a second pressure port at the respective ends of the casing, for connection to the respective tanks, a first and a second spill port each adjacent and associated with its respective pressure port, the two spill ports being spaced apart sufficiently less than the effective length of the plunger means, that in an intermediate position of the plunger means both spill ports are closed by the respective pistons thereof, but upon material shifting of the plunger means as a result of excess pressure at either one of the pressure ports the corresponding spill port is uncovered, and means to retain the plunger means in its intermediate position so long as the opposed pressures effective upon the respective ends of the plunger means by way of the pressure ports are at a predetermined differential, but yieldable for shifting of the plunger means upon material change of the differential pressure in either sense, and means sensitive to pressure change at the two pressure ports to decrease the volume of the liquid-filled duct, thereby to effect approach of the pistons, upon change in the relative pressures at the two pressure ports.

2. Valve mechanism as in claim 1, wherein the means sensitive to pressure change includes a relief chamber communicating with said liquid-filled duct, and a yieldable means to vary the volume of said chamber, yieldable under excess pressure from both tanks, by way of the two pressure ports, or from one tank after the plunger means bottoms, to effect approach of the two pistons and consequent opening of both or of one spill port, as the case may be.

3. Valve mechanism as in claim 2, wherein the yieldable volume-varying means includes a diaphragm constituting a wall of the chamber, and means to vary the resistance of said diaphragm to excess tank pressure, as communicated through the liquid-filled duct.

4. Valve mechanism for coordinating pressure in two tanks such as supply individual interreacting fluids to a common burner or the like, comprising a hollow valve casing, a first and a second spill port spaced axially of said valve casing by a given distance, a first and a second pressure port leading to the respective ends of the valve casing, outwardly of the corresponding spill ports, for connection to the respective tanks, plunger means including two separated individual pistons and means interposed therebetween to maintain the pistons normally separated by a distance at least equal to the distance between the outer edges of the spill ports, said plunger means being guided in the valve casing for sliding movement, centering means acting upon said plunger means in opposition to the pressure applied to the respective ends thereof to retain the plunger means, during normal operation, in position to close off communication between both pressure ports and the corresponding spill ports, but yieldable under the influence of an excess of pressure from one or the other pressure port relative to the opposite pressure port, to uncover the spill port corresponding to the excess pressure port.

5. Valve mechanism as in claim 4, wherein the piston-separating means of the plunger means comprises a liquid column entrapped within the valve casing between the two pistons, and including an expansion chamber communicating with the space occupied by such liquid column, and means yieldable under the influence of excess pressure of a given valve that urges the pistons together, to admit a portion of the liquid column into said expansion chamber.

6. Valve mechanism for coordinating pressure in two tanks such as supply individual interreacting fluids to a common burner or the like, comprising a hollow valve casing, a first and a second spill port spaced axially of said valve casing by a given distance, a first and a second pressure port leading to the respective ends of the valve casing, outwardly of the corresponding spill ports, for connection to the respective tanks, plunger means guided for axial movement within said valve casing, of an axial length at least sufficient to span both such spill ports simultaneously, spring means reacting between the respective ends of the plunger means and the corresponding ends of the valve casing, to maintain the plunger means normally positioned to close both spill ports simultaneously, but shiftable axially in the event of application of a pressure force from one pressure port in excess of the resisting pressure force from the other pressure port, to uncover the spill port at the end corresponding to the then higher pressure port.

References Cited in the file of this patent

UNITED STATES PATENTS

| 357,191 | Fell | Feb. 8, 1887 |
| 2,456,566 | Plank | Dec. 14, 1948 |
| 2,597,177 | Plass | May 20, 1952 |

FOREIGN PATENTS

| 30,616 | Netherlands | Aug. 15, 1933 |